(12) United States Patent
Kotamarti

(10) Patent No.: US 11,297,135 B2
(45) Date of Patent: Apr. 5, 2022

(54) DATA SYNCHRONIZATION

(71) Applicant: Tata Consultancy Services Limited, Mumbai (IN)

(72) Inventor: Rao Kotamarti, Richardson, TX (US)

(73) Assignee: Tata Consultancy Services Limited, Mumbai (IN)

( * ) Notice: Subject to any disclaimer, the term of this patent is extended or adjusted under 35 U.S.C. 154(b) by 445 days.

(21) Appl. No.: 14/228,358

(22) Filed: Mar. 28, 2014

(65) Prior Publication Data

US 2014/0297771 A1 Oct. 2, 2014

(30) Foreign Application Priority Data

Mar. 28, 2013 (IN) .......................... 1237/MUM/2013

(51) Int. Cl.
| | | |
|---|---|---|
| *H04W 4/18* | (2009.01) | |
| *H04L 12/58* | (2006.01) | |
| *H04L 29/08* | (2006.01) | |
| *H04L 67/1095* | (2022.01) | |
| *H04L 51/42* | (2022.01) | |

(52) U.S. Cl.
CPC .......... *H04L 67/1095* (2013.01); *H04L 51/22* (2013.01); *H04W 4/18* (2013.01)

(58) Field of Classification Search
CPC .............................. G06Q 10/107; H04L 67/26
See application file for complete search history.

(56) References Cited

U.S. PATENT DOCUMENTS

| | | | |
|---|---|---|---|
| 6,671,757 B1 | 12/2003 | Multer et al. | |
| 2002/0026436 A1* | 2/2002 | Joory ................ | G06F 17/30575 |
| 2003/0081557 A1* | 5/2003 | Mettala ............. | G06F 17/30581 |
| | | | 370/252 |
| 2003/0087219 A1* | 5/2003 | Berger ..................... | G09B 5/00 |
| | | | 434/118 |
| 2004/0093342 A1* | 5/2004 | Arbo ................. | G06F 17/30569 |
| 2007/0208803 A1 | 9/2007 | Levi et al. | |
| 2007/0279392 A1* | 12/2007 | Rosenberg .............. | A63F 13/10 |
| | | | 345/173 |
| 2011/0153857 A1* | 6/2011 | Dumitru .............. | G06Q 10/107 |
| | | | 709/231 |
| 2011/0269424 A1* | 11/2011 | Multer ................ | H04L 67/1095 |
| | | | 455/411 |

(Continued)

OTHER PUBLICATIONS

'How does Altsync for Outlook work?' Topalt.com [online]. Apr. 19, 2012 [retrieved on Apr. 25, 2016]. Retrieved from the Internet: <URL: https://web.archive.org/web/20120419194439/http://www.topalt.com/content/how-does-altsync-outlook-work>.*

(Continued)

*Primary Examiner* — Kevin T Bates
*Assistant Examiner* — Dae Kim
(74) *Attorney, Agent, or Firm* — Schwegman Lundberg & Woessner, P.A.

(57) ABSTRACT

The present subject matter discloses a method for application data synchronization through a communication network. The method includes receiving application data from at least one user device, formatting the application data based on at least one formatting parameter to generate a data file, where the formatting parameter is indicative of a format of the data file, and transmitting the data file to at least one target syncing device through protocols based on Push Email Synchronization.

7 Claims, 4 Drawing Sheets

(56) References Cited

U.S. PATENT DOCUMENTS

2012/0328189 A1* 12/2012 Usher ............... G06F 17/30256
382/165

OTHER PUBLICATIONS

'How to use Altsync for Outlook?' Topalt.com [online]. Aug. 27, 2012 [retrieved on Apr. 25, 2016]. Retrieved from the Internet: <URL: https://web.archive.org/web/20120827004943/http://www.topalt.com/content/how-use-altsync-outlook>.*

Hansmann et al. "Pervasive Computing". Springer, Berlin, Heidelberg, Boblingen, Germany, 2001. p. 347-354. ISBN 978-3-662-04320-2.*

* cited by examiner

DATA SYNCHRONIZATION

CLAIM OF PRIORITY

This application claims the benefit of priority of Indian Patent Application Serial Number 1237/MUM/2013, entitled "DATA SYNCHRONIZATION," filed on Mar. 28, 2013, the benefit of priority of which is claimed hereby, and which is incorporated by reference herein in its entirety.

TECHNICAL FIELD

The present subject matter relates, in general, to data synchronization and particularly to providing methods and systems for data synchronization between devices in a communication network.

BACKGROUND

Modern computing devices, such as cellular phones, smart phones, tablets, laptops, and desktops, carry various types of information like contacts, documents, reminders, notes, and pictures. Software applications can be utilized on these computing devices to perform various functions ranging from sending and receiving emails, playing games, and browsing the web. Moreover, it is common these days for a user to own more than one such computing device-to serve the above mentioned purposes.

Data Synchronization involves the process of continuous harmonization of data between the computing devices over time. During operation, the user may wish to harmonize, i.e., synchronize data between computing devices in order to reduce the time spent manually matching or transferring information in other owned computing devices. Generally, data synchronization technologies to synchronize such sets of data between computing devices involve a direct connection between the computing devices.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

Figure 1:
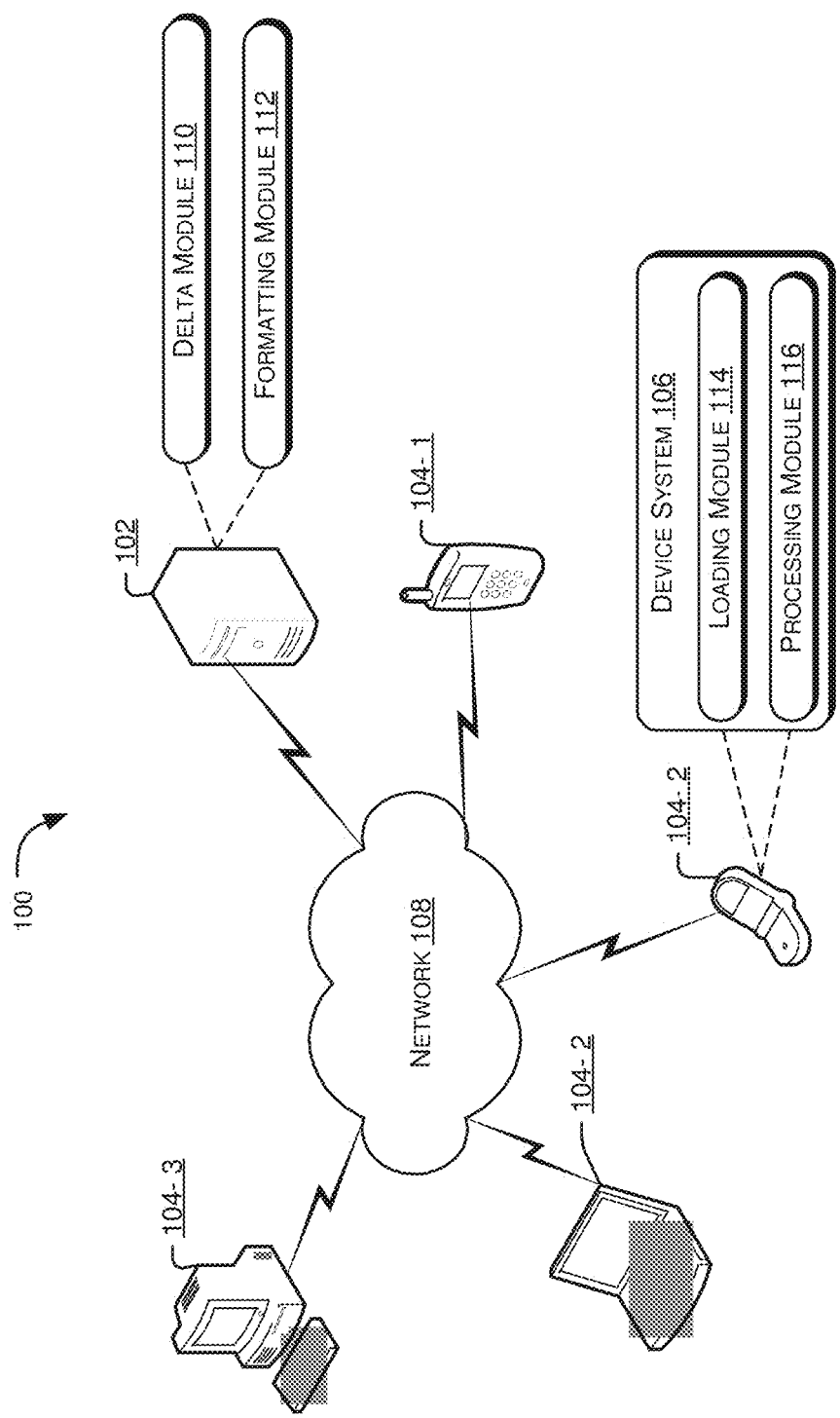
FIG. 1 illustrates a network environment implementing Data Synchronization Systems, in accordance with an embodiment of the present subject matter.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

SUMMARY

This summary is provided to introduce concepts related to providing data synchronization in a wireless communication network. This summary is not intended to identify essential features of the claimed subject matter nor is it intended for use in determining or limiting the scope of the claimed subject matter.

The present subject matter discloses a method for application data synchronization through a communication network. The method includes receiving application data from at least one user device, formatting the application data based on at least one formatting parameter to generate a data file, where the formatting parameter is indicative of a format of the data file, and transmitting the data file to at least one target syncing device through protocols based on Push Email Synchronization.

DETAILED DESCRIPTION

Method(s) and system(s) to perform data synchronization through a communication network are described. Methods can be implemented in systems that include, but are not limited to, computing devices such as, desktop computers, hand-held devices, laptops or other portable computers, advanced cellular phones, tablets, notebooks, and the like, capable of establishing data transfer between computing devices in a communication network. Although the description herein is with reference to mobile phones, the methods and systems may be implemented in other computing devices and systems as well, albeit with a few variations, as will be understood by a person skilled in the art.

Modern day computing devices, such as smartphones, Personal Digital Assistants (PDA), tablets, and the like, host a plethora of applications to create and manage information like contacts, notes, documents, games, calendar information, reminders, photos, videos, emails, scanned documents, and other content. Further, it is not uncommon for a user to own more than one such computing device, and each of these devices may vary in model type and may have different Operating Systems (OS), such as Windows®, Linux™, iOS™, including different mobile based OS, such as Android™, Windows Phone®, iOS™, and Blackberry Operating System® installed thereon. The user may input data or may make changes to existing data in one computing device, and may wish to have his/her inputs reflected on his/her other computing devices as well.

To address such a requirement, conventional data synchronization technologies are present which harmonize application data between two or more computing devices. Such synchronizations can be implemented over a communication network thereby allowing the user to synchronize his/her devices remotely. Certain applications provide refresh intervals or synchronization schedules, by which the application can be programmed to synchronize in a scheduled manner. For example, a contact list, or changes made thereto, on one computing device running on, for example, the Android OS™, can be synchronized with other target computing devices, running on, for example, the Windows OS®.

Since computing devices with different OS's have fundamental architectural differences in the manner in which they execute background processes, automatic data synchronization across such heterogeneous computing devices is a difficult task. Current day technologies use cloud based computing services to achieve data synchronization across platforms using a communication network. In this method, the application data that is required to be synchronized across user devices requires the application generating said data to be actively running on the primary computing device. When the application data is being sent to the cloud, the respective application is required to be running in the foreground of the primary computing device, and simultaneously, the target computing device also follows similar steps, i.e., an application on the target device also needs to be running for it to facilitate receiving of the application data.

Although data synchronization is achieved by the above disclosed methodology, the method can be disadvantageous in a few ways. Firstly, in order for the synchronization to commence, the user needs to actively invoke the said application for affecting the synchronization. The conventional method involves user intervention in that the data has to be manually uploaded and retrieved from the cloud. Moreover, in case the user has specified a refresh interval or synchronization schedule on his computing device, the application is still required to run in the foreground during the synchronization process. Since the method requires the application to be running in the foreground, irrespective of the manner in which the process is invoked, battery depletion in the computing device occurs at a substantially elevated rate. Subsequently, due to elevated application activity, the computing resources of the computing devices are utilized more than moderate levels, thereby leading to degradation of the performance of the computing device.

According to an implementation of the present subject matter, methods and systems to perform application data synchronization through a communication network are described. The present subject matter relates to synchronization of application data across platforms, using protocols based on Push Email Synchronization. In operation, according to an implementation of the present subject matter, an enterprise system can receive application data from one or more user devices, through a communication network. Various communication protocols can be used for receipt of application data from the one or more user devices.

In one implementation, the communication protocol used for receipt of application data is over a native framework, where the receipt of the application data by the enterprise system is in a format not intended for the receipt of application data. In said implementation, the receipt of application data over a communication network is as an email. For example, the application data is received by the enterprise system, from one or more user devices, through a Simple Mail Transfer Protocol (SMTP), in the form of an email. In another implementation, the receipt of application data by the enterprise system may be based on optimization parameters, such as upload file size, or a data format containing sequence numbers, or an application id, or encryption/compression parameters, or any combination thereof. The application data is usually application specific and can include documents, emails, calendars, reminders, presentations, office files, software updates, photos, games, and the like.

In one implementation, the enterprise system can also receive modified application data from the one or more user devices through an SMTP framework. The modified application data may include updates or modifications made to an existing application data from the one or more user devices.

The enterprise system may further assess difference data based on comparing the existing application data to the received application data.

In order to assist application data synchronization across devices, the received application data, which may include fresh application data as well as difference data, by the enterprise system, is formatted to facilitate the transfer of application data in a format that is readable and executable by the target syncing devices. In one implementation, the formatting is based on at least one formatting parameter, for delivery to the target syncing device. In one implementation, the formatting parameters may include an application present on the target syncing device and one of an Operating System (OS) of the target syncing device, and/or email client architecture of the target syncing device or a combination of both. In another implementation, the application data is formatted to generate a data file such that the format of the data file containing application data is readable and executable upon transmission to the target syncing device. In said implementation, the format of the data file may include, but is not limited to, text, binary, text plus binary, and Extensible Mark Up language files (XML) format, such that the format of the data file is readily transmitted to the target syncing device on meeting optimization parameters, such as download file size, or a data format containing sequence numbers, or an application id, or encryption/compression parameters, or any combination thereof. The data file can be generated from the application data based on any conventional mechanisms known in the art. In said implementation, the transmission of the data file containing application data to the target syncing device is through protocols based on Push Email Synchronization.

In an illustrative working example, a music file in an iOS™ based smartphone can be synchronized with a tablet operating on an Android OS™. The synchronization process is initiated and the iOS™ based smartphone transmits the music file to the enterprise system via the communication network. Furthermore, the music file can be formatted based on the at least one of the formatting parameters of the target syncing device. The music file can be formatted to generate a data file in a format, such as text, binary, text plus XML files etc, such that the format of the data file containing application data is readable and executable by the target syncing device. Subsequently, the data file can now be 'pushed' to the tablet running on the Android OS™, through the protocols based on Push Email Synchronization.

Furthermore, the transmission of the application data to the target syncing device through protocols based on Push Email Synchronization is facilitated by recognition of a user account identification address of the target syncing device. In one implementation the user account identification address can include an email address, Media Access Control (MAC) address, Internet Protocol (IP) address and/or other hardware identifiers of the target syncing devices. In said implementation, the recognition of the user account identification address of that target syncing device is performed in order to assist application data synchronization across devices over a communication network.

Furthermore, the received data file can be downloaded by the target syncing device. In one example, the email client of the target syncing device is capable of downloading the email containing the data file received through the protocols based on Push Email Synchronization.

The data file containing application data is further processed to generate the application data that is in a format readable by the target syncing device. In one implementation, the processing of the data file is assisted by a platform specific plug-in that is capable of screening the incoming emails to differentiate the emails containing the data file from regular email. In addition, the platform specific plug-in may utilize an Application Programming Interface (API) to generate the application data that is in a format readable by the application present on the target syncing device. In said implementation, the platform specific plug-in can be provided to either auto activate itself to screen the incoming emails containing the data file, or may be activated by the user clicking on the email containing the data file.

Moreover, the application data is moved to a device data storage area, wherein the device data storage area is, capable of receiving the application data, verify duplicates, and maintain the work-in-progress as well as modified application data that is ready for upload. In one implementation, the modified application data that is ready for upload to the enterprise server for data synchronization is readied for transmission in an offline mode. Once the user device is connected to a communication network, the application data can be transmitted to the enterprise system as an email, for example, through the SMTP framework.

The implementation of the described system and methods of the present subject matter may allow active synchronization of application data across multiple platforms, through the protocols based on Push Email Synchronization. Further, the Push Email Synchronization includes the ability to operate in the background of user devices, thereby allowing unhindered synchronization between user devices with little or no intervention from users. Further, lesser hardware resources being utilized in this method thus resulting in improved user device performance. Also, since the applications are running in the background, the user has lesser applications running on the device to synchronize with his other user devices. Therefore, the battery life of the user's device is prolonged. Further described are methods that allow the user the flexibility of editing or manipulating the application data offline.

It should be noted that the description merely illustrates the principles of the present subject matter. It will thus be appreciated that those skilled in the art will be able to devise various arrangements that, although not explicitly described herein, embody the principles of the present subject matter and are included within its spirit and scope. Furthermore, all examples recited herein are principally intended expressly to be only for pedagogical purposes to aid the reader in understanding the principles of the present subject matter and the concepts contributed by the inventor(s) to furthering the art, and are to be construed as being without limitation to such specifically recited examples and conditions. Moreover, all statements herein reciting principles, aspects, and embodiments of the present subject matter, as well as specific examples thereof, are intended to encompass equivalents thereof.

The manner in which the systems and methods shall be implemented has been explained in details with respect to the FIGS. 1, 2, 3, and 4. While aspects of described systems and methods can be implemented in any number of different computing systems, transmission environments, and/or configurations, the embodiments are described in the context of the following exemplary system(s).

FIG. 1 illustrates a network environment 100, implementing an enterprise data synchronization system 102, which allows a user to synchronize application data between one or more user devices, in accordance with an embodiment of the present subject matter. For the purpose of explanation and simplicity, the enterprise data synchronization system 102 is referred to as an enterprise system 102 hereafter. The enterprise system 102 described herein, can be implemented in any network environment comprising a variety of network devices, including routers, bridges, servers, computing devices, storage devices, etc. In one implementation the enterprise system 102 is connected to one or more user devices 104-1, 104-2 . . . 104-N, individually and commonly referred to as user device(s) 104 hereinafter, through a network 108. Further, the network environment 100 also includes a device data synchronization system 106, for processing application data at one or more of the user devices 104. For the purpose of explanation and simplicity, the device data synchronization system 106 is referred to as a device system 106 hereafter. The enterprise system 102 and the device system 106 can individually be implemented in any computing device, such as a laptop computer, a desktop computer, a notebook, a workstation, a mainframe computer, a server, and the like.

The user devices 104 may be implemented as, but are not limited to, desktop computers, hand-held devices, laptops or other portable computers, tablet computers, mobile phones, PDAs, Smartphones, land-line phones, and the like.

The network 108 may be a wireless or a wired network, or a combination thereof. The network 108 can be a collection of individual networks, interconnected with each other and functioning as a single large network (e.g., the internet or an intranet). Examples of such individual networks include, but are not limited to, Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), Public Switched Telephone Network (PSTN), and Integrated Services Digital Network (ISDN). Depending on the technology, the network 108 includes various network entities, such as gateways, routers; however, such details have been omitted for ease of understanding.

In one implementation, the enterprise system 102 facilitates the synchronization of application data between one or more user devices 104. Various communication protocols, such as SMTP and protocols based on Push Email Synchronization may be used, to facilitate the receipt and transmission of application data by the enterprise system 102, for synchronization of the application data across devices through a communication network. For example, the modifications or updates made to application data on one or more user devices 104-1 can be received and formatted at the enterprise system 102, prior to transmission of the modified application data to the target syncing device 104-2.

In one implementation, the enterprise system 102 includes a delta module 110 to ascertain if any changes have been made to an existing application data based on the received application data from the one or more user devices 104-1. The received application data from the one or more user devices 104-1, can either be fresh application data, i.e. received for the first time, or modified application data, i.e., application data added onto the existing application data with regard to a particular user account or user device. Further, the enterprise system 102 also includes a formatting module 112 to format the received application data, where the formatting is based on formatting parameters. In one implementation, the application data received as an email over a SMTP framework, is formatted by the enterprise system 102 based on formatting parameters, prior to transmission of the application data to the target syncing device. In said implementation, the formatting parameters can include an application running on the target syncing device and either an OS of the target syncing device 104-2, or email client architecture of the target syncing device 104-2, or a combination of both. Further, the application data transmitted by the enterprise system 102, is downloaded and processed by the target syncing device to achieve application data synchronization across devices. In one implementation, the device system 106 includes a loading module 114 to download the application data that is pushed from the enterprise system 102, to the target syncing device 104-2. The target syncing device can be one of the user devices 104, or any other user device that is required to be synchronized. Further, the device system 106, also includes a processing module 116 to process the received application data such that the received application data is in a format readable and executable by the target syncing device 104-2.

Figure 2:
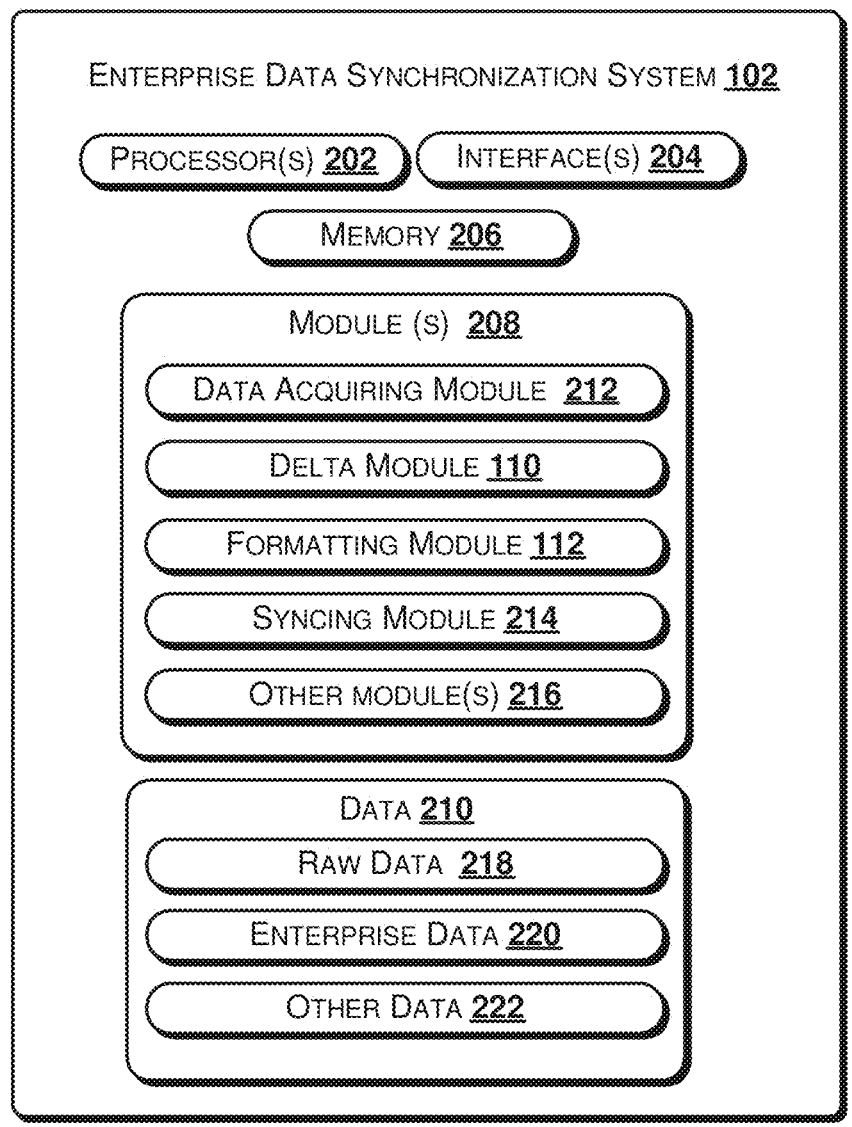
FIG. 2 illustrates components of an Enterprise Data Synchronization System, in accordance with an embodiment of the present subject matter.

FIG. 2 illustrates components of the enterprise system 102, in accordance with an embodiment of the present subject matter. In one implementation, the enterprise system 102 includes processor(s) 202. The processor 202 may be implemented as one or more microprocessors, microcomputers, microcontrollers, digital signal processors, central processing units, state machines, logic circuitries, and/or any devices that manipulate signals based on operational instructions. Among other capabilities, the processor(s) is provided to fetch and execute computer-readable instructions stored in the memory.

Also, the enterprise system 102 includes interface(s) 204. The interface(s) 204 may include a variety of software and hardware interfaces that allow the enterprise system 102 to interact with the entities of the network 108, or with each other. The interfaces 204 may facilitate multiple communications within a wide variety of networks and protocol types, including wire networks, for example, LAN, PSTN, cable, etc., and wireless networks, for example, WLAN, cellular, satellite-based network, etc.

In another embodiment of the present subject matter, the enterprise system 102 may also include a memory 206. The memory 206 may be coupled to the processor 202. The memory 206 can include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Further, the enterprise system 102 may include module(s) 208 and data 210. The modules 208 and the data 210 may be coupled to the processors 202. The modules 208, amongst other things, include routines, programs, objects, components, data structures, etc., which perform particular tasks or implement particular abstract data types. The modules 208 may also be implemented as, signal processor(s), state machine(s), logic circuitries, and/or any other device or component that manipulate signals based on operational instructions.

Further, the modules 208 can be implemented in hardware, instructions executed by a processing unit, or by a combination thereof. The processing unit can comprise a computer, a processor, a state machine, a logic array or any other suitable devices capable of processing instructions. The processing unit can be a general-purpose processor which executes instructions to cause the general-purpose processor to perform the required tasks or, the processing unit can be dedicated to perform the required functions. In another aspect of the present subject matter, the modules 208 may be machine-readable instructions (software) which, when executed by a processor/processing unit, perform any of the described functionalities. The machine-readable instructions may be stored on an electronic memory device, hard disk, optical disk or other machine-readable storage medium or non-transitory medium. In one implementation, the machine-readable instructions can be also be downloaded to the storage medium via a network connection.

In an implementation, the module(s) 208 include a data acquiring module 212, the delta module 110, the formatting module 112, a syncing module 214, and other module(s) 216. The other module(s) 216 may include programs or coded instructions that supplement applications or functions performed by the enterprise system 102. In said implementation, the data 210 includes raw data 218, enterprise data 220, and other data 222. The other data 222 amongst other things, may serve as a repository for storing data that is processed, received, or generated as a result of the execution of one or more modules in the module(s). Although the data is shown internal to the enterprise system 102, it may be understood that the data 210 can reside in an external repository (not shown in the figure), which may be coupled to the enterprise system 102. The enterprise system 102 may communicate with the external repository through the interface(s) 204 to obtain information from the data 210.

The enterprise system 102, as disclosed with regard to FIG. 1, facilitates application data synchronization between the one or more user devices 104-1. For this purpose, the enterprise system 102 can receive application data from the one or more user devices 104-1 through the network 108. Various communication protocols can be utilized for receipt of application data from the one or more user devices 104-1 through the network 108. In an implementation, the data acquiring module 212 is provided to receive application data from the one or more user devices 104-1 through the network 108 using a communication protocol. In one implementation, the communication protocol used for receipt of application data is a native framework, where the receipt of the application data by the enterprise system is in a format not intended for the receipt of application data. In said implementation, the receipt of application data over a communication network is over an email. For example, the native framework unintended for receipt of application data is a Simple Mail Transfer Protocol (SMTP), wherein the application data received from one or more user devices 104-1 is received as an email. In one implementation, the data acquiring module 212 is provided to interact with an SMTP client of the enterprise system 102 to receive the emails containing application data from the one or more user devices 104 and store the received application data in the raw data 218. In another implementation, the receipt of application data by the enterprise system 102 is based on optimization parameters, such as upload file size, data format containing sequence numbers, application id and encryption/compression parameters.

According to an implementation of the present subject matter, the delta module 110 is provided to receive modified application data from the one or more user devices 104 and store the modified application data in the raw data 218. In the implementation, the delta module 110 is provided to ascertain a difference data, based on comparison between an existing application data and the received application data. The difference data can be associated with a value that is either Null or an Integer. If the difference data value is Null, it is indicative that no difference exists between the existing application data and the received application data. In such a case, i.e., in case of no difference, the synchronization process can be aborted. However, if the difference data value is an integer, the difference data value is indicative of quantitative changes made to the existing application data. Therefore, further steps can be taken to proceed with data synchronization of the difference data.

In an illustrative working example, a user can modify application data, such as contact information, in his/her smartphone. Once the changes are saved by the user locally on said smartphone, the smartphone transmits the modified application data to the enterprise system 102. In such a scenario, the enterprise system 102 may assess the difference data upon receipt of the modified application data, based on a comparison between the existing application data with the modified application data. Upon ascertaining the value of the difference data, the enterprise system 102 may perform the necessary steps to proceed further with synchronization of the difference data, if the value of the difference data is not null. However, if the value of the difference data is observed to be Null, the synchronization process may be aborted.

Further, the application data can be formatted based on one or more formatting parameters, to generate a data file, as described earlier. In the said implementation, the formatting module 112 is provided to format the application data based on the formatting parameters, where the formatting parameters include an application present on the target syncing device 104-2 and at least one of an Operating System of the target syncing device 104-2, and/or email client architecture of the target syncing device 104-2. Furthermore, in one example, the formatting module 112 can be provided to create a suitable file type suffix so as to invoke a plug-in on a user device side email client.

In said implementation, the OS's may include iOS™, Android™ Windows®, Linux™, Unix® and may also include different versions of each of these OS's. In the said implementation, the email client may include at least one of Microsoft® Outlook®, Mozilla® Thunderbird™, Apple® Mail, Qualcomm® Eudora®, Novell® GroupWise®, IBM® Lotus Notes®, Microsoft® Entourage®, Netscape® Messenger®, Google™ Gmail™, Yahoo!® Mail, Microsoft® Windows Live™ Hotmail™, and AOL® Mail.

Further, the formatting module 112 is also provided to format the application data to generate the application data in a data file, such that the data file is in a format readable and executable by the target syncing device 104-2. In one implementation, the format of the data file containing application data may include, but not limited to, text, binary, text plus binary, and Extensible Mark Up Language (XML) file format, such that the format of the data file is readily transmitted to the target syncing device based optimization parameters, such as download file size, or a data format containing sequence numbers, or an application id, or encryption/compression parameters, or any combination thereof. In said implementation, the formatted application data that is ready for transmission to the target syncing device 104-2 is stored in the enterprise data 220.

In an illustrative working example, a user may wish to synchronize a word document between a smartphone running on an Android OS™ and a tablet running on iOS™. Once the synchronization process is initiated by the smartphone running on the Android OS™, the word document may be transmitted to the enterprise system 102 as an email through the SMTP framework. However, since the two devices have different OS's, the two devices cannot run certain applications like Word, in a similar format. In such a scenario, during the data synchronization process, the formatting module 112 of the enterprise system 102 can format the word document received from the mobile phone running on an Android OS™, based on the word application running on the iOS™ device and at least one of the OS and/or the email client of the iOS™ device, in order to make the document compatible in the tablet running on iOS. The formatting module 112 may format the word document to generate the word document in the data file format, such as XML, binary, text file, etc. such that the format of the data file is readable and executable by the target syncing device 104-2. Furthermore, the formatted application data can be stored in the enterprise data 220 prior to transmission of the application data to the target syncing device 104-2.

Further, the data file stored in the enterprise data 220 is transmitted to the at least one target syncing device 104-2 through the communication network. Various communication protocols can be used for transmission of the data file to the target syncing device 104-2. In one implementation, the syncing module 214 is provided to synchronize the data file containing application data to the target syncing device 104-2 through the protocols based on Push Email Synchronization. Further, the syncing module 214 determines the target syncing devices and its hardware identifiers and prepares the data for syncing with other target syncing devices. In said implementation, the transmission of the application data to the target syncing device 104-2 through protocols based on Push Email Synchronization is facilitated by recognition of user account identification address of that target syncing device 104-2, such as email address, Media Access Control (MAC) address, Internet Protocol (IP) address and other hardware identifiers of the target syncing devices, in order to assist application data synchronization across devices through protocols based on Push Email Synchronization.

Furthermore, the syncing module 214 can be provided to periodically check the enterprise data 220, and facilitate the transmission of the application data to the target syncing device 104-2 through the protocols based on Push Email Synchronization. In another implementation, the syncing module 214 can be provided to track the user's status on the application data to coordinate backend commits.

Figure 3:
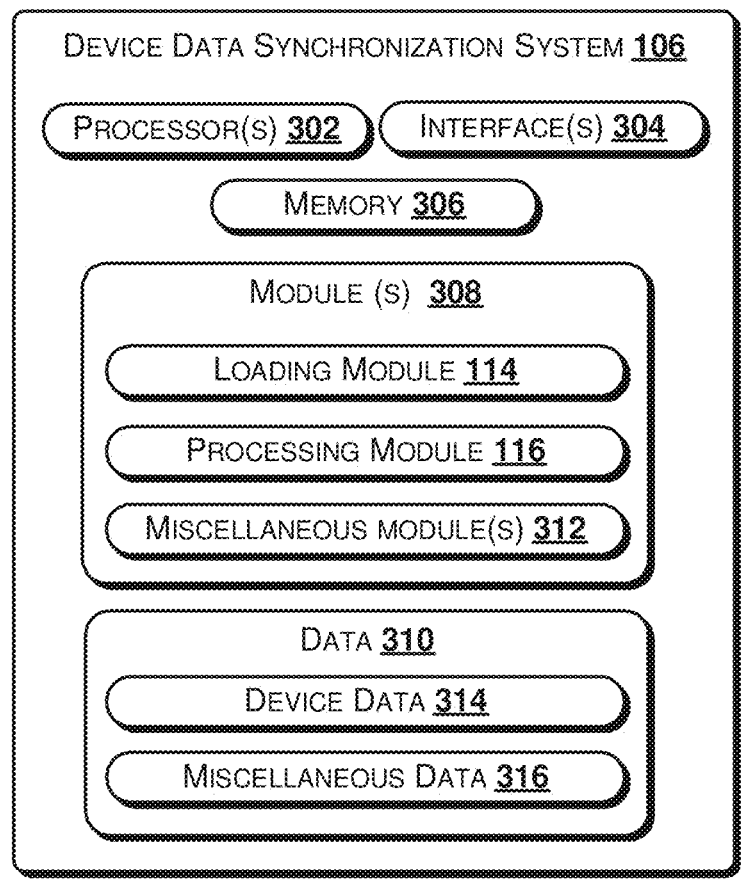
FIG. 3 illustrates components of a Device Data Synchronization System, in accordance with the embodiment of the present subject matter.

FIG. 3 illustrates components of the device system 106 in accordance with an embodiment of the present subject matter. The implementation and functionalities of the processor (s) 302, interface (s) 304, memory 306 components in the device system is analogous to the components described in FIG. 2. In an implementation, the module(s) 308 include a loading module 114, the processing module 116, and miscellaneous module(s) 312. The miscellaneous module(s) 312 may include programs or coded instructions that supplement applications or functions performed by the device system. In said implementation, the data includes synchronized data and miscellaneous data. The miscellaneous data amongst other things, may serve as a repository for storing data that is processed, received, or generated as a result of the execution of one or more modules in the module(s). Although the data is shown internal to the device system, it may be understood that the data can reside in an external repository (not shown in the figure), which may be coupled to the device system. The device system may communicate with the external repository through the interface(s) 304 to obtain information from the data.

In one implementation, the device system 106 is provided to allow application data synchronization between multiple user devices. In one implementation, as shown in FIG. 1, the device system 106 can be implemented in a user device 104. In said implementation, for sake of illustration only, the device system 106 is implemented in user device 104-2. For this purpose, the device system 106 may receive the transmitted data file, from the enterprise system 102, through protocols based on Push Email Synchronization. In said implementation, the data file contains the application data that has been formatted for receipt by the target syncing device 104-2. Further, the data file received by the target syncing device 104 is received in the form of an email. In one implementation, the loading module 114 can be provided to download the email that is pushed from the enterprise system 102 through the protocols based on Push Email Synchronization. In said implementation, the loading module 114 is provided to interact with an email client of the target syncing device 104-2 to download the emails from the enterprise system 102.

The emails containing the data file can be further processed based on application specific instructions. In one implementation, the processing module 116 is provided to interact with a platform specific plug-in to sort emails containing the data file from a regular email. In said implementation, the platform specific plug-in may utilize an Application Programming Interface (API) to generate the application data from the data file, where the application data is in a format readable by application running on the target syncing device 104-2. In an example, as disclosed earlier with regard to the enterprise system 102, a suitable file type suffix can be provided to the data file, by which the processing module 116 can suitably invoke the platform specific plug-in to generate the application data from the data file.

The processing module 116 can be further provided to move the generated application data to the device data 314. In one implementation, the application data stored in the device data 314 can be recognized by respective applications native in the target syncing device 104-2. In another implementation, the stored application data can be further edited or modified in an offline mode. Thus, the modified application data is stored in the device data 314, and can be synchronized with one or more user devices 104-1 when the user is online.

Figure 4:
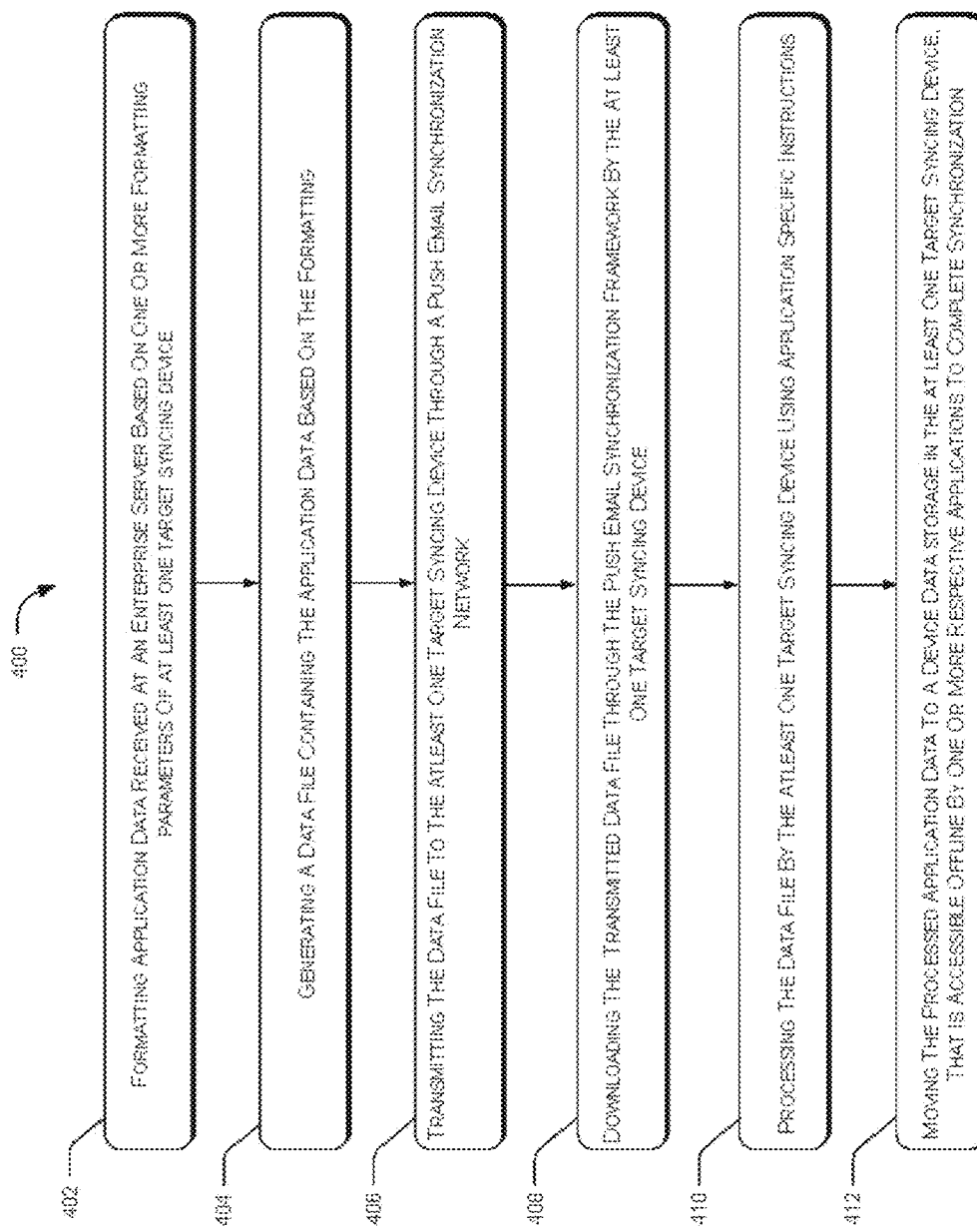
FIG. 4 illustrates a method to synchronize data across user devices through a communication network, in accordance with an embodiment of the present subject matter.

FIG. 4 illustrates a method 400 to synchronize data across user devices through a communication network, according to an embodiment of the present subject matter. The order in which the method is described is not intended to be construed as a limitation, and any number of the described method blocks can be combined in any order to implement the method, or any alternative methods. Additionally, individual blocks may be deleted from the method without departing from the spirit and scope of the subject matter described herein. Furthermore, the method can be implemented in any suitable hardware, software, firmware, or combination thereof.

The method may be described in the general context of computer executable instructions. Generally, computer executable instructions can include routines, programs, objects, components, data structures, procedures, modules, functions, etc., that perform particular functions or implement particular abstract data types. The method may also be practiced in a distributed computing environment where functions are performed by remote processing devices that are linked through a communications network. In a distributed computing environment, computer executable instructions may be located in both local and remote computer storage media, including memory storage devices.

A person skilled in the art will readily recognize that steps of the method can be performed by programmed computers. Herein, some embodiments are also intended to cover program storage devices, for example, digital data storage media, which are machine or computer readable and encode machine-executable or computer-executable programs of instructions, where said instructions perform some or all of the steps of the described method. The program storage devices may be, for example, digital memories, magnetic storage media, such as a magnetic disks and magnetic tapes, hard drives, or optically readable digital data storage media. The embodiments are also intended to cover both communication network and communication devices provided to perform said steps of the exemplary method.

Referring to FIG. 4, at block 402, application data is received by the enterprise system from one or more user devices. As disclosed earlier, the application data is generated by an application running on a user device. The received application data is formatted based on one or more formatting parameters. In one implementation of the present subject matter, the formatting parameters can include an application running on the target syncing device, and at least one of an Operating System (OS) and/or email client architecture of the target syncing device 104-2. For example, in order to perform the application data synchronization, application data received from an application running on an Android OS™ may be formatted by the enterprise system, based on the application running on the iOS™ and at least one of the OS and/or email client architecture of the iOS™ device. In one example, a formatting module 112 of an enterprise system 102 as disclosed earlier is provided to format the received application data based on the one or more formatting parameters.

At block 404, a data file containing application data is generated, based on the formatting, and the generated data file is readied for transmission to the target syncing device through a communication network. In one implementation of the present subject matter, the application data is formatted to generate a data file containing application data based on the formatting parameters, such that the format of the data file may include one of text, binary, Extensible Mark Up Language (XML), text plus binary file format, etc. In one example, the formatting module 112 of the enterprise system 102 is provided to generate a data file based on the formatting.

At block 406, the data file containing application data is transmitted to the target syncing device, based on optimization parameters, such as download file size, or a data format containing sequence numbers, or an application id, or encryption/compression parameters, or any combination thereof. Various communication protocols can be utilized for receipt of application data from the enterprise system, to the target syncing device, through the communication network. In one example, the communication protocol used for transmission of the data file is a Push Email Synchronization framework. In said example, the syncing module 214 in the enterprise system 102, is provided to transmit the data file as an email to the target syncing device 104-2 through protocols based on Push Email Synchronization.

At block 408, the email containing the data file is downloaded by the at least one target syncing device through the protocols based on Push Email Synchronization. In said implementation, the email client of the target syncing device 104-2 downloads emails from the enterprise system 102, including those emails containing the data file. In one example, the loading module 114 of a device system 106 is provided to download the emails from the enterprise system 102, including those emails containing the data file.

At block 410, the data file is processed using application specific instructions to generate the application data that is in a format readable by the application present on the target syncing devices. In said implementation, a platform specific plug-in is provided to sort the emails containing the data file from a regular email. In one example, the platform specific plug-in utilizes an Application Programming Interface (API) to process the email containing data file to generate application data that is in a format readable by the application present on the target syncing device. In one example, a processing module 116 of a device system 106 is provided to process the data file to generate the application data readable by the application present on the target syncing device.

At block 412, the processed application data is moved to a device data. In one implementation of the present subject matter, the storage area can receive the application data, verify duplicates, and maintain the work-in-progress as well as the modified application data that is ready for upload. In one example, a processing module 116 of a device system 106 is provided to move the processed application data to the device data 314.

Although embodiments for methods and systems for application data synchronization through the protocols based on Push Email Synchronization are described, it is to be understood that the invention is not necessarily limited to the specific features or methods described. Rather, the specific features and methods are disclosed as exemplary embodiments to perform application data synchronization through the protocols based on Push Email Synchronization.

What is claimed is:

1. A method for application data synchronization through a communication network, the method comprising:
   receiving application data from at least one user device;
   formatting the application data based on at least one formatting parameter of at least one target syncing device to generate a data file that is readable and executable upon transmission to the at least one target syncing device, wherein the at least one formatting parameter is indicative of a format of the data file; and
   transmitting the generated data file to the at least one target syncing device through protocols based on Push Email Synchronization upon validating a combination of an upload file size, a data format containing sequence numbers, an application identifier, and encryption parameters associated with the generated data file, wherein the generated data file is provided with a suitable file type suffix to invoke a platform specific plug-in on the at least one target syncing device to generate the application data from the data file, wherein the at least one target syncing device is determined prior to transmitting the generated data file based on hardware identifiers of the at least one target syncing device.

2. The method as claimed in claim 1, wherein the application data is received from the at least one user device through a Simple Mail Transfer Protocol (SMTP).

3. The method as claimed in claim 1, wherein the formatting parameters include an application running on the at least one target syncing device and at least one of an Operating System (OS) of the target syncing device, and an email client architecture of the target syncing device.

4. The method as claimed in claim 1 further comprising:
   ascertaining a difference data in comparison with an existing application data, wherein the difference data is one of null and an integer; and
   formatting the difference data when the difference data is not null.

5. A device data synchronization system for application data synchronization received through a communication network comprising:
   a processor;
   a loading module coupled to the processor, provided to download an email containing a data file, through protocols based on Push Email Synchronization, wherein the loading module utilizes an email client for downloading the email and the email client is configured to recognize emails containing the application data;
   a processing module coupled to the processor, to:
      process the data file using application specific instructions, wherein the processing comprises generating application data from the data file, wherein an application present on at least one target syncing device is capable of reading the generated application data, wherein generating the application data from the data file is assisted by auto activating a platform specific plug-in on the at least one target syncing device to sort incoming emails containing the data file; and
      sending the application data to a device data storage, wherein the device data storage is accessible offline by a respective application to complete synchronization, wherein the device data storage is capable of receiving application data, verifying duplicates, maintain work-in progress as well as modified application data that is ready for uploading to a server to achieve the application data synchronization; and
      transmitting the application data to an enterprise system through a Simple Mail Transfer Protocol (SMTP) when the at least one target syncing device is connected to the communication network.

6. The device data synchronization system as claimed in claim 5, wherein the platform specific plug-in utilizes Application Programming Interface (API) to process the data file to generate the application data recognizable by the application present on the target syncing device.

7. A non-transitory computer-readable medium having embodied thereon a computer program instructions for executing a method, the method comprising:
   receiving application data from at least one user device;
   formatting the application data based on at least one formatting parameter of at least one target syncing device to generate a data file that is readable and executable upon transmission to the at least one target syncing device, wherein the at least one formatting parameter is indicative of a format of the data file; and
   transmitting the generated data file to the at least one target syncing device through protocols based on Push Email Synchronization upon validating a combination of a upload file size, a data format containing sequence numbers, an application identifier, and encryption parameters associated with the generated data file, wherein the generated data file is provided with a suitable file type suffix to invoke a platform specific plug-in on the at least one target syncing device to generate the application data from the data file, wherein the at least one target syncing device is determined prior to transmitting the generated data file based on hardware identifiers of the at least one target syncing device.

\* \* \* \* \*